Aug. 17, 1943.                W. R. TUCKER                 2,327,227
                        INJECTION MOLDING MACHINE
                        Filed Feb. 6, 1941          5 Sheets-Sheet 3
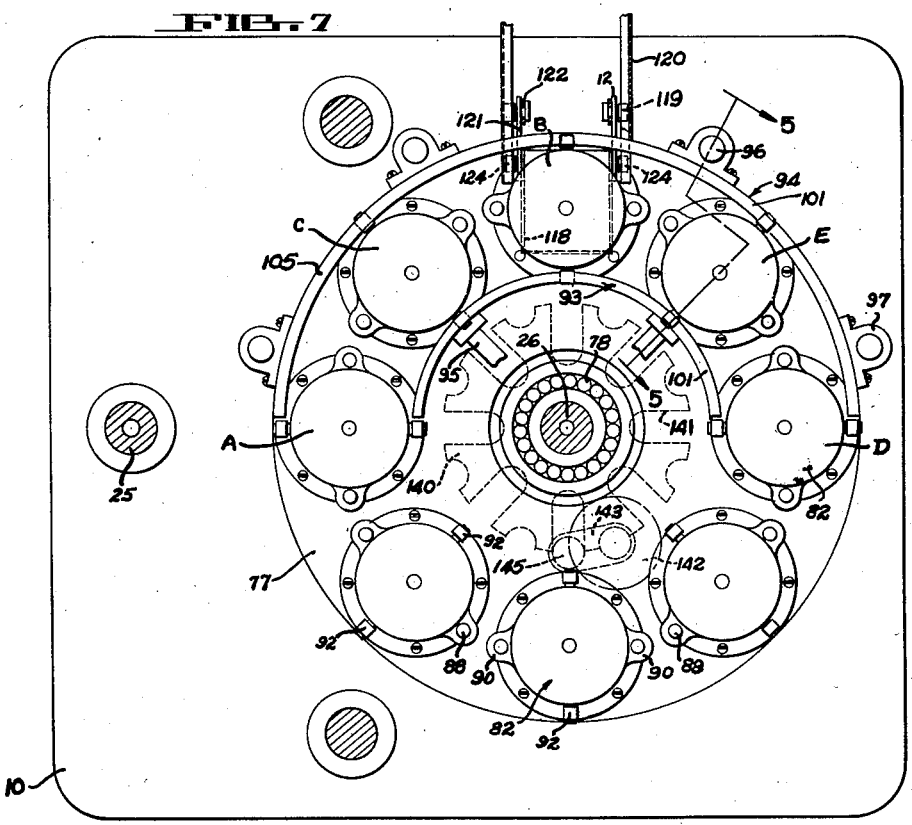
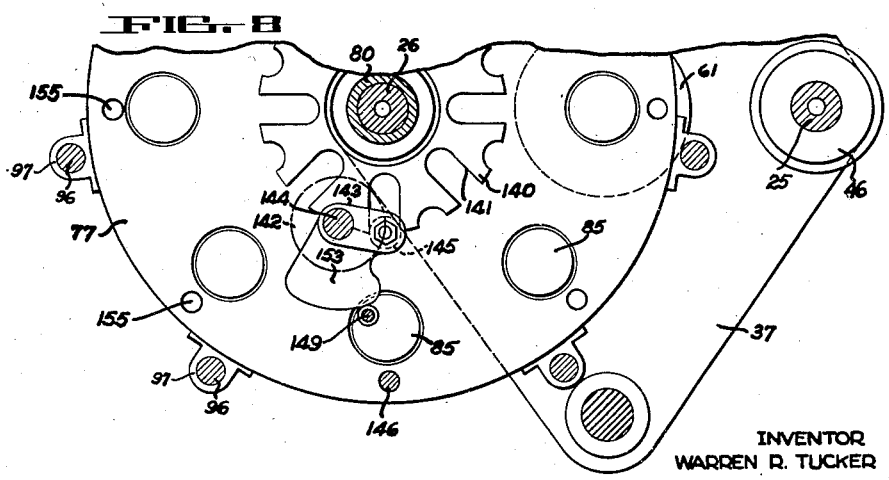
INVENTOR
WARREN R. TUCKER
ATTORNEYS Aug. 17, 1943.  W. R. TUCKER  2,327,227
INJECTION MOLDING MACHINE
Filed Feb. 6, 1941  5 Sheets-Sheet 4
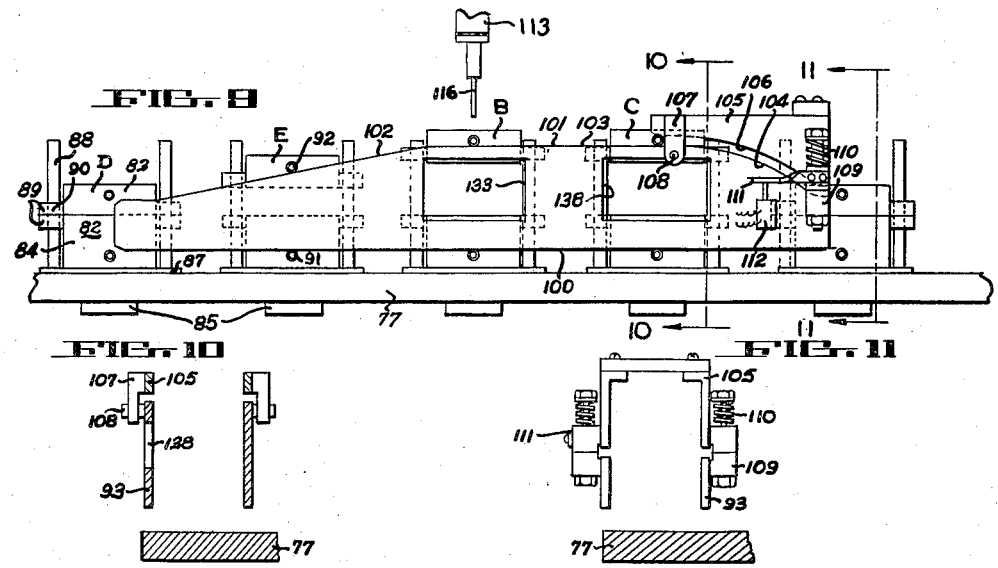
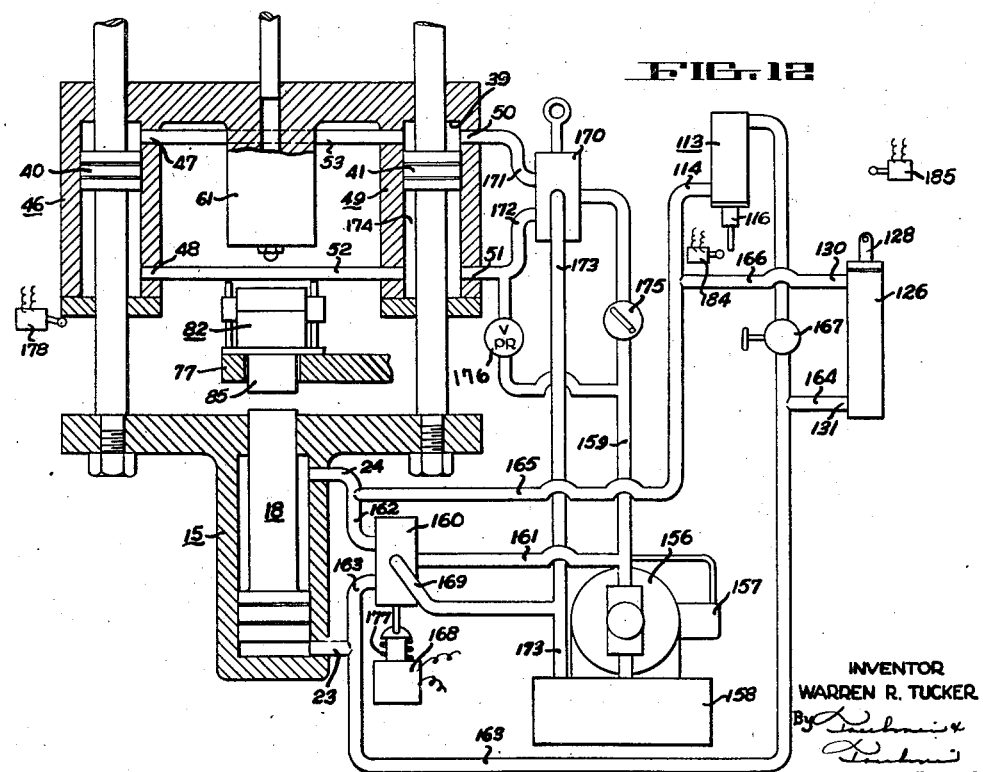
INVENTOR
WARREN R. TUCKER
ATTORNEYS

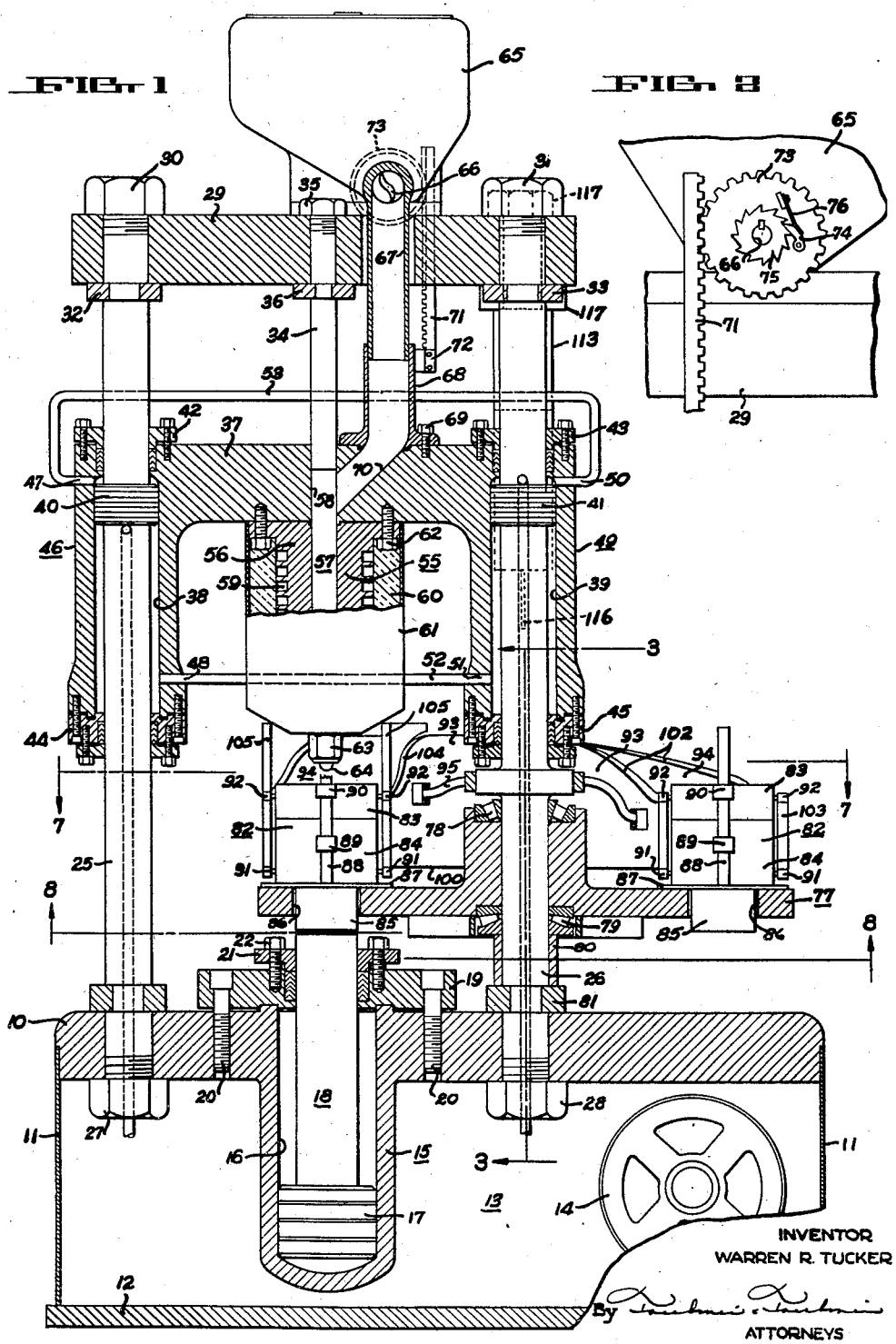

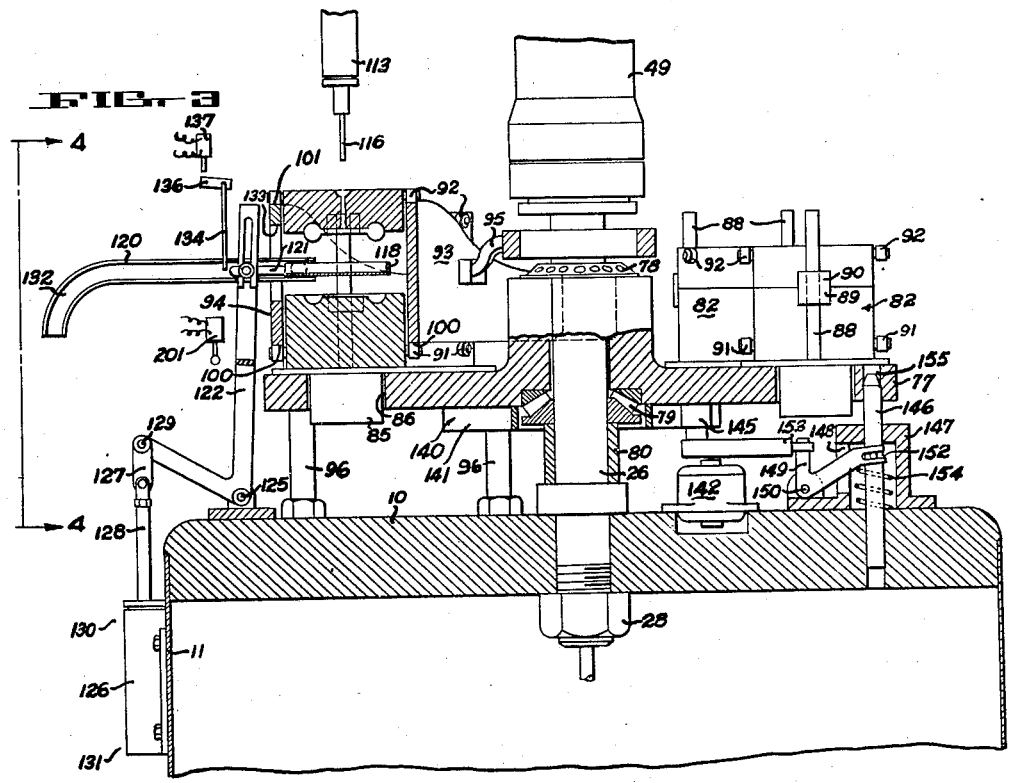
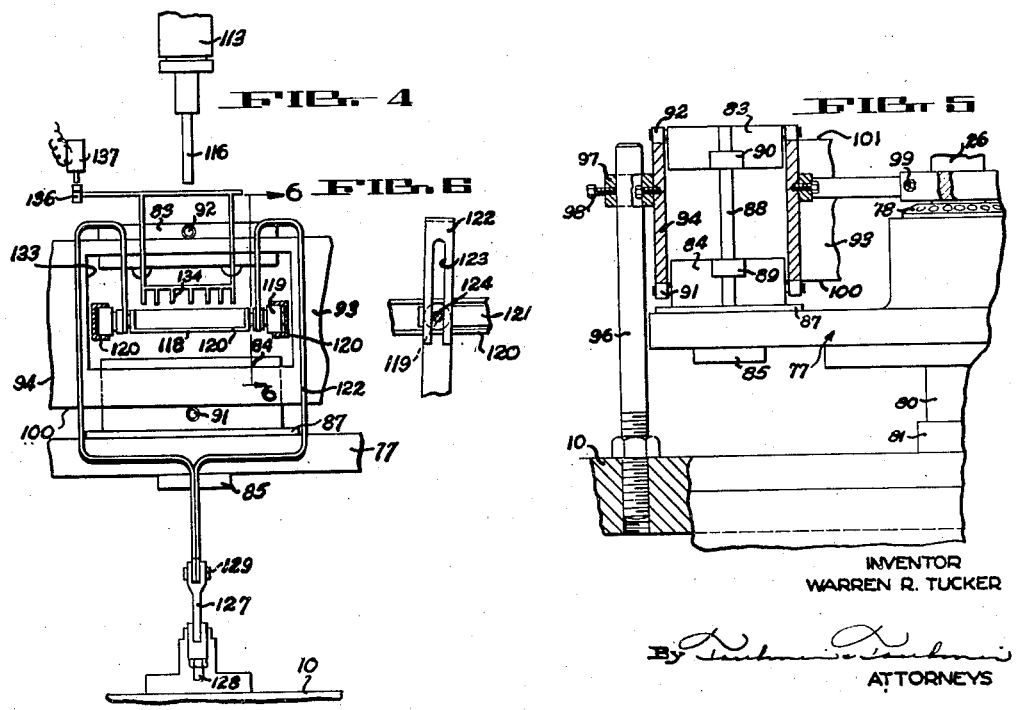

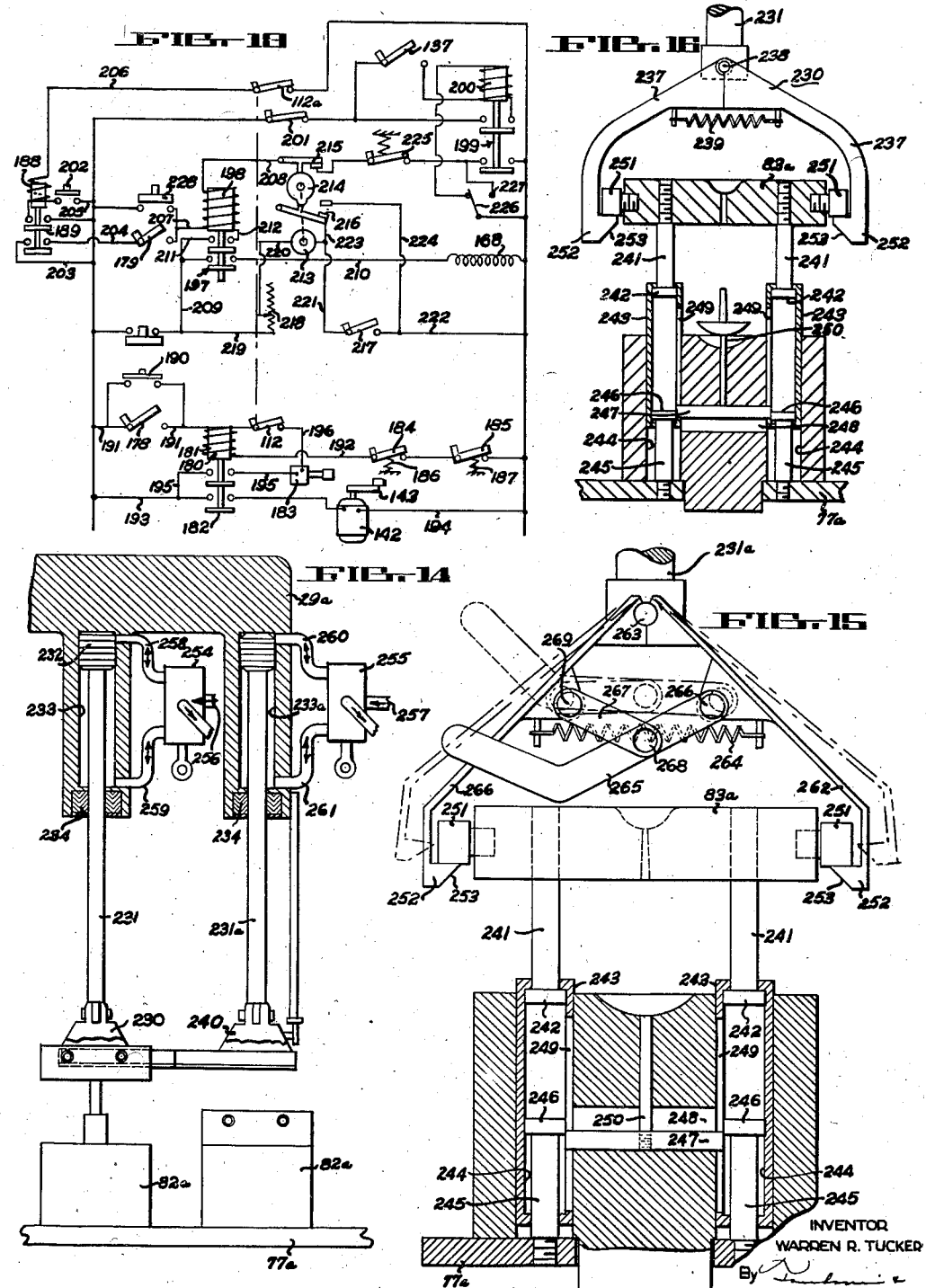

Patented Aug. 17, 1943

2,327,227

UNITED STATES PATENT OFFICE 2,327,227

INJECTION MOLDING MACHINE

Warren R. Tucker, Dayton, Ohio, assignor to The Hydraulic Development Corp. Inc., Wilmington, Del., a corporation of Delaware Application February 6, 1941, Serial No. 377,708

35 Claims. (Cl. 18—30)

This invention relates to plastic injection machines, and particularly to those machines which are automatic in their operation.

An object of the invention is to provide a plastic injection machine wherein a plurality of molds is continuously advanced by successive steps into operative relation with respect the injection cylinder, and wherein the injection of plastic material into the molds is caused by movement of the injection cylinder with respect a stationary plunger.

It is another object of the invention to provide a plastic injection machine in accordance with the foregoing object wherein the movement of the injection cylinder is caused by a hydraulically actuated plunger operating through the molds, whereby the molds are retained in engagement with the nozzle of the injection cylinder and closing pressure is applied upon the molds.

It is another object of the invention to provide a plastic injection machine wherein a plurality of molds is carried upon a turret in a manner that the molds can be raised from the turret and be brought into engagement with the injection cylinder.

It is another object of the invention to provide a plastic injection machine in accordance with the foregoing object wherein a hydraulically actuated plunger raises the molds from the turret and causes engagement thereof with the injection cylinder in order to move the cylinder with respect a stationary injection plunger for injecting plastic material into the molds.

It is still another object of the invention to provide an injection cylinder of a plastic injection machine which is carried upon a reciprocable head, which head is retained in a specific position with respect an injection plunger by means of a hydraulic motor having pressure continuously applied to one side thereof, and wherein a plurality of molds is carried into alignment with the cylinder by means of a rotating turret so that a hydraulically actuated ram associated with the turret can lift the molds into engagement with the cylinder and cause movement of the cylinder with respect the plunger, the fluid pressure in the hydraulic motors associated with the cylinder providing the pressure required for sealing the nozzle upon the mold and for applying clamping pressure between the mold halves.

It is still a further object of the invention to provide a machine in accordance with the foregoing object wherein plastic material is fed into the injection cylinder by a mechanism actuated in response to the reciprocation of the reciprocal head upon which the cylinder is mounted, and which reciprocation feeds material into the cylinder in proportion to the stroke of reciprocation of the cylinder.

It is another object of the invention to provide a plastic injection machine having a turret rotatably mounted thereupon which is constructed and arranged for carrying a plurality of molds, and wherein the molds are adapted to engage cam tracks during their rotation upon the turret so that during a certain portion of the rotation of the molds by the turret the molds will be in engagement with the cam tracks in a manner that the cam tracks will force the molds open to permit work pieces to be ejected therefrom and will again close the molds when they are brought into position adjacent the plastic injection unit of the machine.

It is another object of the invention to provide a plastic injection machine wherein the ram of the injection unit, the hydraulic motor of the ejector and a hydraulic motor for actuating a mechanism for collecting work pieces as ejected, are operated concomitantly so that each cycle of the machine is complete in that a work piece is both injected and ejected from separate molds during a single stroke of the machine.

It is another object of the invention to provide an electrical control system for a plastic injection machine of the type disclosed in the foregoing object, which electrical system will be either completely automatic or can be manually operated, and is provided with suitable safety controls for insuring proper functioning of the machine and for halting the machine during certain intervals thereof if some fault should occur.

It is another object of the invention to provide a hydraulically actuated mechanism which is adapted to function upon two adjacent molds in a manner that a work piece is ejected from one of the molds when the molds are opened and the mold adjacent thereto is adapted to be closed, these events occurring during the injection cycle of the machine and the mechanism being associated with a mechanism for advancing molds successively into engagement therewith.

It is another object of the invention to provide a mechanism in accordance with the foregoing object which operates concomitantly with the stroke of the injection ram of the plastic injection machine.

Further objects and advantages will become apparent from the following description and from the drawings.

In the drawings:

Figure 1 is a vertical cross-sectional view of a plastic injection machine constructed in accordance with the teachings of this invention.

Figure 2 is an elevational view of the feeding mechanism for feeding material into the injection cylinder of the machine.

Figure 3 is a vertical cross-sectional view of a portion of the machine and is taken along line 3—3 of Figure 1.

Figure 4 is an end elevational view looking in the direction of the arrow 4 in Figure 3, showing the mechanism which carries the work piece from the molds after ejected.

Figure 5 is a cross-sectional view of a portion of the machine taken along line 5—5 of Figure 7.

Figure 6 is a cross-sectional view of the yoke mechanism for operating the work piece removing mechanism and is taken along line 6—6 of Figure 4.

Figure 7 is a horizontal cross-sectional view taken along line 7—7 of Figure 1.

Figure 8 is a horizontal cross-sectional view taken along line 8—8 of Figure 1, looking upwardly at the turret of the machine.

Figure 9 is a somewhat diagrammatic view showing the development of the cam track for opening and closing of the molds and the relation thereof to the ejecting mechanism.

Figure 10 is a cross-sectional view taken along line 10—10 of Figure 9.

Figure 11 is an end elevational view looking in the direction of the arrows 11—11 of Figure 9.

Figure 12 is a diagrammatic view of the hydraulic system used upon the injection machine of this invention.

Figure 13 is a wiring diagram of the electrical system for the injection press of this invention.

Figure 14 is a somewhat diagrammatic cross-sectional view of a modified mechanism for opening the molds and ejecting work pieces therefrom.

Figure 15 is an end view partially in cross-section and partially in elevation of one of the mold releasing mechanisms of Figure 14.

Figure 16 is a cross-sectional view of the mold lifting and ejecting mechanism of the other of the mechanisms of Figure 14.

In this invention the plastic injection machine consists of a base or bed 10, having side walls 11 and a bottom portion 12 thereby forming a compartment 13 in which a high pressure fluid pump, actuated by an electric motor 14, can be positioned. The storage tanks for the actuating fluid for the injection press can be arranged within this compartment 13, or the compartment may have dividing walls therein which of themselves provide the desired fluid storage tanks.

Referring to Figures 1 and 12, Figure 1 discloses the mechanical mechanism of the press and Figure 12 discloses the hydraulic system for the press, the machine consists of a hydraulic motor 15 having a cylinder 16 wherein a piston 17 reciprocates. The piston 17 carries a plunger or ram 18 which extends through an end plate 19 for the cylinder 16. The end plate 19 is secured to the bed 10 by means of suitable bolts 20. A sealing member 21 is positioned around the plunger or ram 18 and is retained upon the end plate 19 by means of the bolts 22. The hydraulic motor 15 is provided with hydraulic fluid connections 23 and 24 at the opposite ends thereof.

A pair of strain rods 25 and 26 are secured to the bed 10 by means of the bolts 27 and 28 respectively. These strain rods extend upwardly from the bed 10 and in parallel relation with respect each other. The upper ends of the strain rods 25 and 26 are connected by means of a stationary head 29, the bolts 30 and 31 respectively securing the head 29 between said bolts and the collars 32 and 33 respectively.

An injection plunger is carried by the stationary head 29 and is secured thereto by means of the bolt 35 and the collar 36. A reciprocable head 37 is positioned upon the strain rods 25 and 26 and is carried below the injection plunger 34. This reciprocable head 37 has a pair of vertically extending bores 38 and 39 which are of larger diameter than the strain rods 25 and 26 over which they extend in an axial relation.

The strain rod 25 has a collar 40 secured thereon, while the strain rod 26 has a collar 41 secured thereon. These collars 40 and 41 are of larger diameter than the respective strain rods and are of such diameter as to slidably engage the bores 38 and 39 provided in the head 37 so that the collars 40 and 41 act as pistons within the respective bores 38 and 39. A sealing member closes the upper end of the bore 38, while a sealing member 43 closes the upper end of the bore 39. A sealing member 44 closes the lower end of the bore 38 while a sealing member 45 closes the lower end of the bore 39.

The hydraulic motors thus provided by the bores 38 and 39 and carried by the head 37, are provided with fluid passages for connecting the same to a source of pressure fluid. The bore 38 which forms part of the hydraulic motor 46, is provided with passageways 47 and 48 at the opposite ends thereof, while the bore 39 forming a part of the hydraulic motor 49 is provided with fluid passageways 50 and 51 respectively in the upper and lower ends thereof. A conduit 52 cross-connects the lower portions of the bores 38 and 39, while a conduit 53 cross-connects the upper portion of these bores whereby the hydraulic motors will be actuated in parallel when fluid is directed to the respective ends of the motors 46 and 49.

The head 37 carries an injection cylinder 55, which consists of a cylindrical body 56 having a bore 57 which is in axial alignment with the bore 58 provided in the head 37, which bores 57 and 58 are in axial alignment with the injection plunger 34. The body of the injection chamber 56 is provided with a plurality of annular grooves 59 through which fluid is circulated for heating plastic material within the injection chamber or bore 57. It is to be understood that while the annular grooves or chambers 59 have been specifically disclosed as fluid circulating chambers, yet they can be dispensed with and other forms of heating apparatus be used for heating the injection cylinder 56. Such heating apparatus is well known in the art and is therefore not further disclosed. Injection chamber 56 is surrounded by the heat insulating wall 60 which in turn is enclosed in a material jacket 61. The injection chamber body 56 is removably secured to the head 37 by means of the bolts 62.

The forward end of the injection chamber 57 terminates in an injection nozzle 63, which nozzle is removable to permit replacement and cleaning thereof. The nozzle 63 is provided with a round head portion 64 which is adapted to engage a socket in the molds advanced into alignment with the nozzle 63 for sealing engagement therewith during the injection cycle.

A feeding mechanism is provided for feeding plastic material to the injection cylinder in proportion to the movement of the cylinder with respect the injection plunger. As will be hereinafter described, the injection cylinder 55 is reciprocal with respect the injection plunger 34 for ejecting material from the cylinder chamber 57 into the molds positioned adjacent the nozzle 63. The plastic material must thus be fed to the bore 57 of the injection cylinder 55 in proportion to the quantity which is ejected from the bore upon each stroke of the cylinder 55. This mechanism consists of a feeding hopper which is suitably secured upon the stationary head 29. The feeding hopper 65 has a worm or screw 66 in the discharge throat thereof for feeding material from the hopper into the discharge passage or conduit 67. The conduit 67 telescopes into the conduit 68 which is secured to the reciprocable head 37 by means of the bolts 69. An angular bore 70 communicates with the conduit 68 and extends into communication with the injection chamber 57 within the injection cylinder 55. The conduits 67 and 68 and the bore 70 provide means for conducting plastic material from the hopper into the bore 57 of the injection cylinder.

In order to forward material from the hopper 65 in quantities which will be in proportion to the material which is ejected from the bore 57 a rack is secured to a bracket 72 extending from the conduit 68 so that the rack 71 is reciprocated throughout the same stroke of reciprocation as the head 37, as will be hereinafter described more completely. The rack 71 engages a gear 73 suitably journaled upon the hopper 65, see Figure 2. The gear 73 carries a ratchet tooth 74 which is retained in engagement with a ratchet wheel 75 mounted upon the end of the screw shaft 66. A leaf spring 76 retains the ratchet tooth 74 in engagement with the ratchet wheel 75 so that upon downward movement of the rack 71 the ratchet tooth 74 will engage the ratchet wheel 75 and thus rotate the work 66 within the feed hopper 65 so that material will be fed through the conduit 67. During the up stroke of the rack 71 the gear 73 will rotate freely about the ratchet wheel 75 since at this time the ratchet tooth will ride over the teeth of the ratchet gear. It may thus be seen that for a definite stroke of reciprocation of the injection cylinder 55 with respect the injection plunger 34 that the rack 71 will rotate the worm or screw 66 a predetermined number of revolutions, whereby a predetermined quantity of material will be fed through the conduit 67 into the injection chamber 57, and which quantity of material will be in direct proportion to that which has been ejected from the chamber.

The injection press is arranged to carry a plurality of molds into successive alignment with the injection cylinder 55. The mechanism provided for this purpose consists of a turret 77 which is rotatably mounted upon the strain rod 26 and is carried thereon by means of the roller bearings 78 and 79. The roller bearing 79 is supported by means of a collar 80 which in turn rests upon a collar 81 which supports the strain rod 26. The collar 80 thus becoming the thrust member and the bearing 79 becoming the thrust bearing for supporting the turret 77.

A plurality of molds 82 consisting of an upper half 83 and a lower half 84 is carried by the turret 77. The lower half 84 of each of the molds 82 is provided with a depending portion 85 which extends through openings 86 provided in the turret 77. The molds 82 are equidistantly spaced around the surface of the turret 77 and are arranged loosely upon the surface of the turret so that they can be lifted by means of the depending portion 85 during certain portions of the injection cycle as will be hereinafter described.

A plate is secured to the turret 77 and may be either adjacent the molds 82 or can surround the same. This plate 87, surrounding the molds 82, being provided with an opening of the same diameter as the opening 86 in the turret 77 so that the depending portion 85 of the molds 82 can extend therethrough. The plates 87 carry vertically extending rods 88 secured thereto in parallel relation and adjacent the molds 82. Preferably, the rods 88 are diametrically opposite each other when positioned adjacent the molds 82.

The lower halves 84 of the molds 82 are provided with extending bosses 89 through which the rods 88 extend in suitable bores. The upper halves 83 of the molds 82 are provided with extending bosses 90 which are also journaled upon the rods 88. These extending bosses 89 and 90 provide means for guiding the mold halves 83 and 84 when reciprocated vertically with respect the turret 77, or when the upper half 83 is reciprocated vertically with respect the lower half 84 during opening and closing of the mold 82, which operation will be more fully described.

The lower halves 84 of the molds 82 are also provided with rollers 91 positioned diametrically opposite each other upon the mold half 84, and are suitably journaled upon stub bearing shafts provided in the lower mold half 84. The upper mold halves 83 are also provided with rollers 92 which are positioned diametrically opposite each other on these mold halves.

In order to open and close the molds 82 upon rotation of the turret 77, a pair of arcuately shaped cam tracks 93 and 94 are positioned vertically adjacent the upper surface of the table of the turret 77. These cam tracks 93 and 94 are adapted to be engaged by the rollers 91 and 92 provided on the lower and upper mold halves 84 and 83 respectively when the mold 82 is rotatively carried by the turret 77 in its circuit of rotation.

The inner cam track 93 is supported by a spider 95 carried upon the strain rod 26 whereby the cam track 93 is stationarily positioned with respect the turret 77 and is vertically arranged with respect the surface of the turret 77. The outer cam track 94 is carried upon a plurality of rods, see Figures 5 and 7, which is threaded into the base 10. The outer cam track 94 carries a plurality of bosses 97 which is journaled upon the vertically positioned rods 96 and is adjustably mounted by means of the bolts 98. The inner cam track 93 is adjustably carried upon the strain rod 26 and is secured in position thereon by means of the bolts 99.

The cam tracks 93 and 94 are spaced from the upper face of the table of the turret 77 a sufficient distance that the rollers 91 on the lower mold halves 84 can engage the under surface of the tracks 93 and 94. The under surfaces 100 of the tracks 93 and 94 are parallel to the upper surface of the table of the turret 77 so that when the rollers 91 of the lower mold halves 84 engage the surfaces 100, these lower mold halves are retained upon the upper surface of the turret table. The upper surfaces 101 of the cam tracks 93 and 94 have an inclined portion 102 which when engaged by the rollers 92 on the upper mold halves 83, causes the upper mold halves to leave the lower mold halves 84 and thereby open the molds 82. The projection of the cam tracks 93 and 94 is better shown in Figure 9 wherein the arcuate shape of the cam tracks is laid out in a straight line. The inclined surface 102 of the cam tracks levels off into a horizontal portion 103 which is parallel to the lower surfaces 101. This horizontal portion 103 then enters into a declining surface 104 whereby the upper mold halves 83 are permitted to return into engagement with the lower mold halves 84 when the molds are indexed by means of the turret.

To insure closure of the molds 82 when passing over the declining surfaces 104 of the cam tracks 93 and 94 a pair of short cam tracks is positioned vertically adjacent the cam tracks 93 and 94 and has lower surfaces 106 thereon which are complementary to the surfaces 104 on the cam tracks 93 and 94 but are spaced from the surfaces 104 a sufficient distance that the rollers 92 upon the mold halves 83 may pass therebetween. This arrangement thereby provides a definite cam slot through which rollers of the upper mold halves must pass in order to re-engage the lower mold halves.

The short cam tracks 105 are pivotally mounted upon the cam tracks 93 and 94 by means of the depending ears 107 which are pivotally secured to the cam tracks 93 and 94 by means of the pins 108. The forward end of the short cam track 105 engages a stop member 109 and is retained in engagement therewith by means of the compression spring 110. The spring 110 provides resilient means whereby the forward end of the cam tracks 105 may lift with respect the cam tracks 93 and 94, should the upper mold half 83 refuse to engage the lower mold half 84 due to some obstruction between the mold halves.

A lever 111 is carried by the forward end of the cam track 105 and engages an electric switch 112 and normally retains the switch in closed position. When the forward end of the cam track 105 is raised due to incomplete closing of the mold halves 83 and 84, the electric circuit will be broken through the switch 112 to thereby halt operation of the injection machine in a manner which will be hereinafter described.

A mechanism for ejecting work pieces from the mold while the molds are in open position is provided vertically adjacent the cam tracks 93 and 94 and is more specifically positioned vertically adjacent the horizontal land area 103 of the cam tracks. The ejecting mechanism consists of a double acting hydraulic motor 113 having fluid connections 114 and 115 at opposite ends thereof. The piston of the hydraulic motor 113 carries a plunger 116 which extends outwardly of the hydraulic motor 113 and is adapted to reciprocate with respect the upper mold half 83 when brought thereadjacent by indexing of the turret. The hydraulic motor 113 is carried upon the stationary head 29 of the press and is suitably secured thereto by means of the bolts 117. The hydraulic motor 113 is positioned vertically above the mold 82 when the mold is indexed below the same, and the position is such that the ejector plunger 116 will be aligned with the sprue opening in the upper mold half 83. The work piece is provided with a suitable locking projection thereon which retains the same in the upper mold half 83 when the mold halves are separated by means of the cam tracks 93 and 94. The ejection plunger 116 will thus eject the work piece from the upper mold half 83 when reciprocated through the sprue opening thereof.

To remove the work piece which is ejected from the upper mold half 83, a mechanism is provided for reciprocating a pan 118 into and out of the space between the open mold halves when the mold halves are vertically adjacent the ejection plunger. This pan 118 is carried upon rollers 119 which are guided in tracks 120 which are positioned adjacent parallel sides of the pan 118. The forward end of the pan 118 is provided with forwardly extending arms 121 adjacent each side of the pan which are engaged by a yoke 122. The yoke is provided with a slot 123 which engages a pin 124 interconnecting the yoke 122 with the arms 121. The lower end of the yoke 122 is provided with a bellcrank lever pivoted at 125. The end of the bellcrank lever is connected to a double acting hydraulic motor 126 by means of a link 127, which link interconnects the plunger 128 extending from the hydraulic motor 126 and the pivot connection 129 on the end of the bellcrank lever.

The hydraulic motor 126 is provided with fluid connections 130 and 131 at opposite ends thereof for reciprocation of the plunger 128, and thus horizontally reciprocating the pan 118 through the bellcrank lever.

When the plunger 128 is moved in a downward direction, as viewed in Figure 3, the yoke 122 will carry the pan 118 outwardly from between the open mold halves 83 and 84 to an extent wherein the rollers 119 will be directed into the curved forward end 132 of the roller tracks 120, whereby the pan 118 will be tilted to empty the work piece therefrom which has been ejected into the same from the upper mold half 83 when in position adjacent the same. The outer cam track 94 is provided with a suitable window or opening 133 through which the pan 118 can be reciprocated into adjacent relation between the open mold halves 83 and 84.

In order to indicate the presence or absence of a work piece in the pan 118, and thereby insuring continuation of the operation of the injection machine, a comb 134 is pivotally mounted at 135. This comb 134 carries a lever 136 which engages an electric switch 137, which switch is normally open but which is momentarily closed when the work piece passes under the comb 134. If a work piece is present in the pan 118 when removed from between the open mold halves, the closing of the switch 137 will provide circuit for completion of operation of the injection machine, whereas, if a work piece is absent from the pan 118 the switch 137 will not be momentarily closed, whereby the mechanism for completing the circuit, establishing circuit relation to the main control of the injection machine, will not be operated and the injection machine will halt operation before the beginning of a new injection cycle.

The injection machine just described is arranged in a manner whereby the turret 77 has a table thereof arranged horizontally between the vertically positioned ram 18 and the injection cylinder 55. The molds 82, carried upon the turret 77, are adapted to be advanced successively into alignment with the injection cylinder 55 and the ram 18 so that when the ram 18 is reciprocated by the hydraulic motor 15, the mold 82 will be lifted from the table of the turret 77 and brought into engagement with the nozzle 63 of the injection cylinder 55. Continued further advancement of the ram 18 causes the injection cylinder 55 to reciprocate the bore 57 thereof with respect the injection plunger 34 whereby plastic material positioned within the injection chamber 57 will be ejected therefrom into the mold 82.

The injection cylinder 55 and the ram 18 are thus positioned in axial alignment and are vertically arranged at the molding station A, see Figure 7. The hydraulic motor 113 for operating the ejection plunger 116 is vertically adjacent a mold carried upon the turret 77 and is in axial alignment therewith, the ejection station being indicated at B, see Figure 7. The station indicated at C, see Figures 7 and 9, is a station wherein the upper and lower mold halves are still in their spaced relation to permit manipulation of the mold surfaces either for cleaning the surfaces or for positioning inserts within the mold. A window 138 is provided in the cam track 94 to permit access into the interior of the mold 82 when adjacent the station C. A suitable automatic mechanism can be provided for placing the inserts within the molds while adjacent station C, or the inserts can be placed therein manually. The stations indicated at D and E are the stations wherein the upper mold half is separated from the lower mold half when indexed in its circumferential travel by the turret 77. The remaining stations upon the turret 77 are provided to permit cooling of the molded article after leaving the molding station A.

The mechanism for indexing the turret 77 consists of a Geneva wheel 140 having a plurality of radial slots 141. An electric motor 142 carries an arm 143 upon the shaft 144 which is rotated by means of the motor 142. The arm 143 carries a roller 145 which engages the radial slots 141 during rotation thereof by the arm 143 in order to advance the Geneva wheel a determined arc of movement and thereby indexing the turret 77 a determined arc of movement. This Geneva type of indexing mechanism is well known in the art and therefore further description is not deemed necessary.

The indexing mechanism, however, rotates the turret 77 periodically to bring successive molds adjacent the various stations A to E inclusive whereby the mold is operated and various functions performed thereon, as heretofore described, which functions are coordinated to occur during a single cycle of operation of the injection machine.

To insure the exact position of the turret 77 with respect the injection plunger 116 a turret locking mechanism is provided. It can readily be appreciated that since the sprue opening in the mold is very small that the axial positioning of the mold adjacent the ejector plunger 116 must be accurate to prevent damage to the sprue opening. The turret locking mechanism consists of a plunger 146 which is reciprocably guided within a casing 147 and the bed 10 of the press. The casing 147 is suitably secured to the bed 10 and is also provided with a slot 148 in the side wall thereof through which a bellcrank lever 149 can extend. The bell crank lever 149 is pivoted on a pin 150 which is carried by the casing 147. One end of the lever 149 engages a pin 151 carried by the plunger 146, a slot 152 being suitably provided in the end of the lever. The opposite end of the bellcrank lever 149 is engaged by a cam 153 which is carried upon the motor shaft 144. A compression spring 154 is positioned between the bed 10 and the end of the arm of the bellcrank lever 149 for normally urging the plunger 146 in an upward direction into engagement with a hole 155 in the turret 77.

The cam 153 is arranged with respect the arm 143 that upon the arm 143 entering the slot 141 the cam 153 will engage the bellcrank lever 149 to retract the plunger 146 from the hole 155, thereby releasing the turret 77. and permitting the indexing mechanism to index the turret. The cam 153 will release the bellcrank lever 149 before the turret 77 has completed its indexing motion so that the plunger 146 will be spring pressed against the lower face of the turret 77 to permit the plunger 146 to re-enter the next successive hole 155 immediately upon the proper axial relation being obtained between the hole 155 and the plunger 146, thereby locking the turret 77 in its newly indexed position.

The hydraulic circuit for the press just described consists of a variable delivery constant speed fluid pump 156 which is driven by the electric motor 14. The pump 156 is provided with a pressure control 157 which regulates the maximum pressure delivered by the pump 156. Variable delivery pumps having pressure control are well known in the art and therefore further description of this item is not deemed necessary since any of the well known pumps having pressure control can be utilized in the system.

A reservoir 158 is provided for the fluid which is to be circulated to the various actuating elements of a hydraulic system. The pump 156 delivers through the discharge conduit 159 to a 4-way valve 160 through means of a branch conduit 161. The 4-way valve 160 is connected to the fluid inlets 23 and 24 of the hydraulic motor 15 by means of the conduits 162 and 163. The conduit 163 also conducts fluid to the inlet 115 of the ejector motor 113, and conducts fluid by means of a conduit 164 to one side of the hydraulic motor 126. The conduit 162 communicates with a branch conduit 165 which conducts fluid to the fluid passage 114 of the ejector motor 113 and to the fluid passage 130 of the hydraulic motor 126, a conduit 166 interconnecting the fluid passage 130 with the conduit 165.

A choke or orifice valve 167 is provided in the conduit 163 beyond the conduit connection 164 so that the fluid conducted to the fluid connection 115 of the ejector motor 113 flows therethrough at a lesser rate than to the hydraulic motor 126 through the conduit 164 and the passage 131. This arrangement permits the ejector motor to lag in operation behind the hydraulic motor 126. This arrangement is provided to permit the hydraulic motor 126 to move the collecting pan 118, disclosed in Figure 3, into position between the open mold halves 83 and 84 before the ejector plunger 116 will eject the work piece from the upper mold half 83. The orifice or choke valve 167 can be manually varied to control the difference in rate of operation of the motors 113 and 126.

The 4-way valve 160 is connected to a solenoid actuating element 168 for shifting the valve between positions whereby the conduit 161 communicates with the conduits 162 and 163 for directing the flow of fluid under pressure to either of the conduits. An exhaust conduit 169 is connected to the valve 160 to return fluid to the storage tank 158 from either side of the hydraulic motor 15 as connected thereto by the position of the valve 160.

The fluid pressure discharge line 159 also conducts fluid under pressure to a 4-way valve 170. This valve 170 communicates with the fluid inlet connections 50 and 51 of the hydraulic motor 49 by means of the conduits 171 and 172 respectively. An exhaust conduit 173 connects the valve 170 with the fluid storage tank 158. The valve 170 is normally positioned with the fluid connection continuously established between the fluid inlet line 159 and the fluid connecting conduit 172, whereby fluid under pressure is continuously applied to the under side of the piston 41 and within the chamber 174 whereby the normal position of the head 37 with respect the piston 41 is with the piston 41 bottomed in the upper portion of the bore 39 for the hydraulic motor 49. Since the hydraulic motor 46 is connected in parallel with the hydraulic motor 49 through the cross conduits 52 and 53, the position of this motor will be the same as the position of the hydraulic motor 49 and will operate in parallel therewith.

A check valve 175 is positioned in the conduit 159 for permitting flow of fluid to the valve 170 but preventing flow of fluid in a return direction. A pressure relief valve 176 is arranged to by-pass the check valve 175. The pressure relief valve, however, is set to by-pass pressure from the conduit 172 to the conduit 159 only when the pressure in the conduit 172 is above the pressure in the conduit 159, or above a predetermined maximum pressure.

When the actuating elements of the injection press are in the position as disclosed in Figure 12, a valve 160 has been shifted to the position wherein pressure from the conduit 161 has been directed through the conduit 162 to the fluid inlet 24 of the hydraulic motor 15 to retract this motor. Fluid pressure has also been conducted through the conduit 165 to the fluid inlet 114 of the motor 113 and the fluid inlet 130 of the hydraulic motor 126 whereby the actuating pistons of these motors have been retracted to retract the ejector from the mold which is in the ejection station B and to retract the pan 118 from between the mold halves. Pressure fluid at this time is conducted through the conduit 159 through the valve 170 to the fluid inlet 51 of the hydraulic motor 49, whereby the head 37 is moved in its complete downward position. The mechanisms are then in condition to permit indexing of the turret 77 by actuation of suitable electric controls, which electrical system will be hereinafter described.

After the turret 77 has completed its indexing motion the solenoid 168 is energized to shift the 4-way valve 160 to establish fluid communication between the conduit 161 and the conduit 163 to thereby conduct fluid under pressure to the fluid inlet 23 of the hydraulic motor 15 and to conduct fluid to the hydraulic motor 113 and 126 through the fluid inlets 115 and 131 respectively. It is of course understood that upon shifting of the valve 160 that the exhaust conduit 169 communicates with the conduits 162 and 165 to permit return flow of fluid from the hydraulic motors 15, 113 and 126 to the fluid storage tank 158.

Shifting of the valve 160 has not, however, influenced the fluid connection between the conduit 159 and the fluid inlet 51 of the hydraulic motor 49 so that pressure is still being exerted within the chamber 174.

Immediately upon connection of the conduit 161 with the conduits 163 the ram 18 begins a forward stroke to engage the protruding portion 85 of the mold 82 which has been indexed thereadjacent. The ram 18 lifts the mold 82 from the turret 77 and causes the upper mold half 83 to engage the nozzle 63. Upon engaging the nozzle 63 pressure will be applied to the upper mold half 83 since hydraulic fluid pressure is existent in the chamber 174 tending to resist upward movement of the head 37. The pressure will be increased between the nozzle 63 and the mold 82 until the pressure exerted by the ram 18 overcomes the pressure in the chamber 174 to thereby further advance the mold 84 in an upward direction. The differential in pressure area of the piston 17 and the pistons 40 and 41 determines the pressure which will be applied to the mold 82 to thereby clamp the mold halves together and to seal the nozzle with respect the upper mold half 83. When the pressure in the hydraulic motor 15 overcomes the pressure in the chamber 174 the injection cylinder 55 will be moved upwardly so that the chamber 57 thereof will reciprocate over the injection plunger 34, whereby plastic material which has been heated in the injection chamber 57 will be ejected therefrom into the mold 82. The upward movement of the injection cylinder will continue until the pressure of the pump 156 reaches its maximum value which is sufficient to force the plastic material within the mold into the minute crevices in the mold cavity. A suitable dwell period is occasioned by means of a timing mechanism hereinafter described with regard the electrical system.

Since the chamber 174 decreases in volume upon upward movement of the head 37 the fluid therein must be discharged to permit the head to move upwardly. The pressure relief valve 176 will open when the pressure within the chamber 174 is a predetermined value above the pressure in the conduit 159 thereby by-passing the check valve 175 and permitting the fluid in the chamber 174 to enter the discharge conduit of the pump 156 and aid in supplying fluid to the main ram 18.

Concomitant with operation of the main ram 18 the hydraulic motors 113 and 126 advance their plungers 116 and 128 respectively, to thereby operate the ejector mechanism and the work piece carrying mechanism in parallel with operation of the main ram 18. The injection machine is thus arranged to eject a work piece concomitant with injection of a new work piece.

As previously described, however, the choke valve 167 prevents the hydraulic motor 113 from operating as rapidly as the hydraulic motor 126, whereby the collecting pan 118 can enter the space between the open molds before the ejector mechanism ejects the work piece from the upper mold half.

After the dwell period the electrical mechanism, hereinafter described, breaks circuit to the solenoid 168 to permit the compression spring 177 to shift the valve 160 to its former position, whereby the ram 18, the plunger 116 and the plunger 128 will be retracted concomitantly. Since pressure has been continuously established to the conduit 172 the head 37 will be moved downwardly upon refilling of the chamber 174.

If, for any reason, the injection chamber 57 of the injection cylinder 55 is required to be cleaned of material existing in the chamber 57, the valve 170 can be shifted manually whereby fluid pressure is established between the conduit 159 and the conduit 171, which operation will place the upper end of the bore 39 in communication with pressure fluid. The head 37 will then be moved independently of the remainder of the mechanism of the injection machine to pass through a complete injection cycle to eject all material from the chamber 57. Such an operation would be performed in case it is desired to change the grade of plastic material to be ejected, or to change the color.

The mechanism for feeding plastic material into the injection chamber 57 has heretofore been described, as well as the operation thereof. This mechanism will feed the proper quantity of material to the injection chamber 57 in direct proportion to the stroke of reciprocation thereof with respect to the plunger 34. Each cycle of the injection machine will thus produce a work piece, the indexing mechanism operating between the injection cycles to index successive molds adjacent the injection and ejection stations, and to open and close the molds by engaging the molds with the cam tracks 93 and 94 in a manner heretofore described.

The electrical system for controlling operation of the injection press can be divided into two parts, one of which is the electrical control mechanism for indexing the turret and the other is the mechanism for controlling the injection cycle. These two portions of the electrical circuit are interconnected by means of two limit switches 178 and 179. The limit switch 178 momentarily closed upon completion of an injection cycle to energize electric circuit to the electrical controls controlling the indexing mechanism, while the limit switch 179 is momentarily closed by completion of the indexing of the turret to initiate the injection cycle. The limit switch 178 is actuated by the head 37 or by the ram 18 when in their completely retracted position so that the indexing mechanism is initiated in actuation in response to the completion of the injection cycle. As heretofore described the ejection and injection mechanisms are operated concomitantly so that the completion of the cycle of one completes the cycle of the other.

The electrical controls for the indexing mechanism consist of a relay 180 having an operating solenoid 181 which actuates the relay blades 182 to close the same against their respective contacts upon energization of the solenoid 181. A normally closed electric switch 183 is positioned in a holding circuit for the solenoid 181 and is adapted to be momentarily opened by the arm 143 rotated by the electric motor 142 upon completion of the indexing cycle. Electric switches 184 and 185 are provided in series circuit with the solenoid 181, and are spring actuated by means of the springs 186 and 187 to normally retain the switches in open position. The switch 184 is actuated by the ejection plunger 116 to its closed position when the plunger 116 is in its fully retracted position. The switch 185 is actuated by the work piece collecting pan 118, or the mechanism operating the pan, in a manner that the switch 185 is closed as long as the pan is retracted from between the mold halves 83 and 84. An electric switch 112 is placed in the holding circuit of the solenoid 181, which switch is actuated by movement of the cam tracks 105, as previously described.

The switch 112 is a double acting switch and has a contactor 112a operated in parallel therewith. The contactor 112a is in series circuit with a solenoid which controls the positioning of a relay 189 in circuit relation with the injection cycle control mechanism in a manner to establish either a single cycle manual control circuit or a fully automatic circuit.

A manually operated by-pass switch 190 is normally open and is adapted to short circuit the switch 178 for purposes hereinafter described.

The operation of the indexing mechanism is initiated by a momentary closing of the switch 178 whereby electric circuit is established to the solenoid 181 through the line 191 and the line 192. Momentary closing of this circuit closes the relay blades 182 against their cooperating contacts so that electric circuit is established to the indexing motor 142 through the lines 193 and 194. A holding circuit is simultaneously established to the solenoid 181 through the line 195, the switch 183, the line 196, the solenoid 181 and the line 192. It is understood that when the injection machine is indexing the switches 184 and 185 are closed because the injection plunger and the work piece collecting pan are at their retracted positions. The indexing motor 142 is thus actuated until the arm 143 strikes the switch 183 which momentarily opens the circuit established therethrough to break the holding circuit for the solenoid 181, whereby the relay 182 drops out, halting operation of the electric motor 142.

At the instant the switch 183 is opened the switch 179 is momentarily closed by the turret reaching the completion of its indexing motion, thereby initiating an injection cycle hereinafter described.

As previously described, if the mold halves 83 and 84 should remain open when the cam track 105 tends to force the same closed the electric switch 112 will be opened, whereby the switch blades 112 and 112a will break circuit through the solenoids 181 and 188. It is to be understood that the breaking of the circuit through the switch 112 occurs during the indexing motion and therefore if the switch blade 112 opens circuit through the solenoid 181 the indexing motion will be immediately stopped, and since the blade 112 is in the holding circuit for the relay 182 the relay will drop out whereby if the blade 112 is forced closed the indexing cannot continue since the solenoid 181 cannot reenergize when the circuit is reestablished through the blade 112. When this series of events occurs the turret cannot be indexed by establishment of momentary circuit through the switch 178 since this switch has already functioned upon the downward stroke of the head 37 or the ram 18 whichever it is connected to, and it cannot again function at this time. Hence, the manually operated push-button switch 190 is required to short circuit the electric switch 178 to thereby reestablish circuit to the solenoid 181. This switch 190 can be retained in the closed position manually until the troublesome die is indexed past the end of the cam tracks 105 at which time the switch 112 will again close circuit.

However, when the switch blade 112 is opened the switch blade 112a is also opened so that the solenoid 188 drops the relay 189 thereby breaking circuit to the electric switch 179 which controls initiation of the electric mechanism controlling the injection cycle for a complete automatic cycle of operation of the machine. When this switch 179 is closed momentarily by completion of the indexing of the turret electric circuit will not be made to the electric mechanism controlled thereby so that the injection press must be started manually.

The electric control mechanism for controlling the injection cycle of the press consists of a relay 197 which is actuated by an electric solenoid 198. The relay 197 controls energization of the solenoid 168 which actuates the valve 160 for controlling the direction of flow of fluid to the hydraulic motor 15 and also establishes a holding circuit for the solenoid 198.

To permit initiation of an injection cycle a relay 199 is provided which is actuated by a solenoid 200. The relay 199 controls completion of the circuit for the solenoid 198 and also establishes a holding circuit for the solenoid 200. The solenoid 200 is controlled by a normally closed limit switch 201 and a normally open limit switch 137. The normally closed switch 201 is actuated by the outward movement of the work piece collecting pan 118, and is actuated in advance of actuation of the normally open limit switch 137. The normally open limit switch 137 is actuated by the comb 134, which comb indicates the presence or absence of a work piece in the pan 118, as previously described. The relay 200 is closed continuously except for the short interval of time between the operation of the switch 201 and the switch 137. The switch 201 breaks the holding circuit for the solenoid 200 to permit the relay 199 to drop out while the switch 137 momentarily closes circuit to the solenoid 200 to reestablish the closing circuit for the same and thereby place the relay in condition to permit closing of the circuit through the solenoid 198 for initiation of an injection cycle.

If a work piece should be absent from the collecting pan 118 when the same is retracted the switch 137 will not be actuated so that the relay 199 will not close. This function at this point will not prevent the indexing of the turret by the mechanism heretofore described, but will prevent the initiation of an injection cycle since the electric circuit through the solenoid 198 cannot be completed with the relay 199 in the open position.

It is therefore seen that the control of the injection cycle is responsive to the presence of a work piece in the work collecting pan 118. This safety measure is provided to insure ejection of a work piece at the ejection station.

The relay 189 is provided for determining whether the press shall operate on a single manually controlled cycle or on a continuously automatic cycle. If the solenoid 188 of this relay is energized by closing the push button 202, the blades of the relay engage their cooperating contacts whereby circuit is established to the switch 179 by means of the electric lines 203 and 204. A holding circuit is established for the solenoid 188 through the electric lines 205 and 206.

Assuming the relays 189 and 199 to be closed, when the electric switch 179 is momentarily closed by the turret 77, electric circuit is momentarily made to the solenoid 198 through the electric lines 203 and 204, the switch 179, electric lines 207 and 208, whereby the relay 197 is closed to establish circuit to the solenoid 168 through the lines 209 and 210. A holding circuit is simultaneously made by the relay 198 through the lines 211, 212 and 208.

A timing mechanism for controlling the duration of the period of advancement of the ram is placed in the electric circuit for the solenoid 198. This timing mechanism is arranged to retain the solenoid 168 energized for an interval of time which will be sufficient to permit injection of a plastic material into the mold and will include sufficient time to provide a predetermined dwell period at the end of the injection stroke, whereby the plastic material in the mold will be forced into the smallest crevices in the mold cavity, and can include such time as will permit a partial cooling of the plastic in the mold before releasing the pressure upon the plastic material in the mold by reversing the operation of the injection ram 18. The timing mechanism consists of an electric motor 213 which drives a cam 214, which cam 214 actuates the electric switches 215 and 216. The electric switch 215 is placed in the circuit for the solenoid 198 while the electric switch 216 is placed in the electric circuit for the motor 213. An electric switch 217 is placed in parallel with the electric switch 216 and is adapted to be momentarily closed wither by the head 37 or the ram 18 during the up stroke thereof, and represents the beginning of the injection cycle. The timer controls the reversing of the ram 18 after initiation of the operation of the timer by the switch 217. The period of operation of the motor 213 is controlled by a variable resistor 218. Upon initiation of an injection cycle, as heretofore described, the ram 18 or the head 37 will momentarily close the electric switch 217 whereby electric circuit is made to the timer motor 213 through the lines 219, 220, 221 and 222. Momentary making of this circuit starts the timing motor 213 whereby the cam 214 permits the switch 216 to close and thereby making electric circuit for the motor 213 through the lines 219, 220, 223, 224 and 222. The period of time required for rotation of the cam 214 into engagement with the electric switch 215 determines the interval of time over which the injection and dwell will occur. When the cam 214 engages the switch 215 electric circuit through the solenoid 198 is broken thereby dropping out the relay 197 and deenergizing the solenoid 168, whereby the 4-way valve 160 is reversed and the ram is started on its retraction movement. The electric motor 213 continues to rotate until the cam 214 breaks circuit through the switch 216.

An electric switch 225 is provided in series circuit with the solenoid 198 and is actuated by the head 37 to limit the maximum upward movement thereof with respect the injection plunger 34. This switch is provided to prevent undue upward movement of the head 37 should the head be reciprocated without a sufficient charge of plastic material therein, or for any reason which would permit the head 37 to reciprocate upwardly to an extent which would damage the machine. Opening of the switch 225 breaks circuit to the solenoid 198 to deenergize the solenoid 168 and reverse operation of the ram 18.

If it is desired to operate the injection machine without requiring operation of the ejector mechanism or the work piece collecting pan 118, a selector switch 226 is provided which when in engagement with the contact 227, short circuits the relay 199 whereby the press can be operated without requiring operation of the ejector mechanism or the work piece collecting pan 118.

As previously described, when the molds 82 are prevented from closing when passing below the cam tracks 105 the switch blades 112 and 112a are opened whereby the relay 188 is deenergized and the injection machine is taken off of full automatic operation. When this occurs it is first necessary to clear the trouble and then advance the turret by closing the switch 190 as heretofore described. The manual start button 228 must then be closed to establish circuit manually to the solenoid 198. At any time after the solenoid 198 has been energized the manual control button 202 can be closed to re-energize the relay 188 and thereby reestablish automatic operation of the press.

In Figures 14, 15 and 16 there is shown a modified construction for opening the molds, ejecting the work pieces therefrom, and of closing the molds. There are two mechanisms provided which are similar in structure but which are slightly different in function, one of the mechanisms 230 is shown in Figure 16, while the other of the mechanisms 240 is shown in Figure 15. The mechanisms 230 and 240 are carried upon plungers 231 and 231a, which plungers have enlarged heads 232 reciprocable within bores 233 and 233a provided in the stationary head 29a. The bores 233 and 233a are sealed at their lower ends by the packing glands 234. The cooperation of the heads 232 and the bores 233 and 233a provides hydraulic motors for reciprocating the mechanisms 230 and 240.

The mold 82a is carried by the turret 77a into vertical alignment with the plungers 231 and 231a and the mechanisms 230 and 240 respectively. The molds 82a being successively advanced from the mechanism 230 to the mechanism 240.

The mechanism 230 consists of a pair of track members 237 which are pivotally mounted upon a pivot pin 238 carried by the plunger 231. A tension spring 239 extends between the track members 237 and retains them in closed position, as shown in Figure 16. The mold 82a has an upper half 83a and a lower half 84a. The upper mold half 83a carries a pair of pins 241 which have enlarged heads 242. The enlarged heads 242 extend within cylinders 243 which are slidably mounted within bores 244 provided in the lower mold half 84a. A pair of pins 245 is secured to the turret 77a and has enlarged heads 246 which extend into the cylinders 243. The horizontally positioned pin 247 is carried within a slot 248 provided in the lower mold half 84a. The ends of the pin 247 extending within slots 249 provided in the side walls of the cylinders 243. The pin 247 carries an ejection pin 250 journaled within a bore within the lower mold half 84a.

The upper mold half 83a carries rollers 251 which are adapted to engage the extending ledges 252 provided on the lower edges of the track members 237.

When this mechanism 230 is reciprocated with respect the mold 82a the cam edges 253 on the ledges 252 strikes the rollers 251 to spread the track members 237 to permit the same to pass over the rollers 251. The spring 239 will snap the track members 237 to their closed position thereby engaging the rollers 251. Upon upward reciprocation of the plungers 231 and 231a the upper mold half 83a will be lifted from the lower mold half 84a. The heads 242 of the pins 241 will engage the upper ends of the cylinders 243 to move the same in an upward direction until the lower ends of the slots 249 engage the pin 247 thereby lifting the same. When the pin 247 is lifted the ejection pin forces the work piece from the mold. The cylinders 243 are limited in their upward travel by the heads 246 on the pins 245. It is thus seen that the upward movement of the mechanism 230 opens the molds and causes an ejection of the work piece.

In order to permit the upper mold half 83a to again engage the lower mold half 84a the mold halves 83a and 84a are indexed by the turret 77a when the plungers 231 and 231a are in their upward position whereby the mold which was adjacent the mechanism 230 will be indexed into the mechanism 240. The mechanism 230 represents the ejection station B, while the mechanism 240 represents the station C for manipulation of the mold such as insertion of inserts, which station has been previously described.

To control the reciprocation of the plungers 231 and 231a 4-way control valves 254 and 255 respectively are provided. The control valves 254 and 255 are manually actuated and have pressure fluid inlets 256 and 257 respectively. The valve 254 has fluid conduits 258 and 259 connected to opposite ends of the bore 233, while the valve 255 has fluid conduits 260 and 261 connected to opposite ends of the bore 233a.

The mechanism 240 consists of a pair of track members 262 which are pivotally mounted by a pin 263 to the plunger 231a. A tension spring 264 urges the track members 262 to their closed position as disclosed in Figure 15. A lever mechanism is provided for opening the track members 262 against the tension of the spring 264 and consists of a lever arm 265 which is pivoted at 266 to the right-hand track member 262. A short connecting link 267 is pivotally secured to the lever 265 at 268 and is pivotally secured to the left-hand track member 262 at 269. This lever mechanism is arranged to overthrow center in a snap acting manner to either retain the track members 262 in open relation, as shown in dot-dash lines in Figure 15, or permit the spring 264 to position the track members 262 in closed position, as disclosed in full lines.

The mechanism 230 is adapted to be reciprocated by means of the manually controlled valve 254 and the hydraulic motor associated therewith at the initiation of the injection cycle, whereby the mechanism 230 will pick up the upper mold half 83a and eject the work piece from the lower mold half 84a. Before the ending of the retraction portion of the injection cycle the valve 255 is manually operated to reciprocate the mechanism 240 and thereby close the mold 82a positioned thereunder. When the mechanism 240 sets the upper mold half 83a upon the lower mold half 84a the lever arm 265 disengages the track members 262 from the rollers 251 to thereby permit immediate retraction of the mechanism 240 by the hydraulic motor associated therewith.

When the turret 77a is indexed the mold vertically adjacent the mechanism 240 is carried toward the injection station, while the open mold vertically adjacent the mechanism 230 is carried in its open condition to the mechanism 240, the track members 237 and 262 respectively being in horizontal alignment to permit movement of the mold 82a therebetween.

It is of course understood that the manually operated valves 254 and 255 could be operated automatically and incorporated within the full automatic cycle of operation for a press as heretofore described.

Having thus fully described my invention, what I claim as new and desire to secure by Letters Patent is:

1. An injection press comprising a stationary injection plunger, a movable head carrying an injection cylinder for reciprocation upon said plunger, means for guiding movement of said movable head comprising a rod extending through said head and having a piston thereon, and a chamber in said head cooperating with said rod and forming a cylinder to provide a pressure motor for positioning said cylinder with respect to said plunger, a hydraulically actuated ram positioned below said injection cylinder, and means for successively advancing a plurality of molds into alignment with said injection cylinder, said ram removing said molds from said advancing means and into engagement with said cylinder to thereby advance the same with respect said plunger to inject material into said molds, said first mentioned hydraulic motors providing means for resisting movement of said cylinder to provide clamping pressure upon said molds.

2. An injection press comprising an injection plunger, an injection cylinder operatively associated therewith, a turret constructed and arranged to carry a plurality of molds into successive positions in alignment with said cylinder, a stationary cam track associated with said turret for opening and closing of said molds upon rotation of said turret, and a hydraulically actuated ram for causing said molds to engage said cylinder and inject material into said mold.

3. An injection press comprising an injection plunger, an injection cylinder operatively associated therewith, a turret constructed and arranged to carry a plurality of molds into successive positions in alignment with said cylinder, a stationary cam track associated with said turret for opening and closing of said molds upon rotation of said turret, and a hydraulically actuated plunger positioned adjacent said turret, said plunger being constructed and arranged in a manner to move through said turret to lift said mold into engagement with said cylinder to cause injection of material from said cylinder into said mold.

4. An injection press comprising an injection plunger, an injection cylinder operatively associated therewith, a turret constructed and arranged to carry a plurality of molds into successive positions in alignment with said cylinder, a stationary cam track associated with said turret for opening and closing of said molds upon rotation of said turret, a hydraulically actuated plunger positioned adjacent said turret, said plunger being constructed and arranged in a manner to move through said turret to lift said mold into engagement with said cylinder to cause injection of material from said cylinder into said mold, and hydraulic means associated with said cylinder for resisting said plunger to thereby apply clamping pressure to said mold.

5. An injection press comprising an injection plunger, an injection cylinder operatively associated therewith, a turret constructed and arranged to carry a plurality of molds into successive positions in alignment with said cylinder, a stationary cam track associated with said turret for opening and closing of said molds upon rotation of said turret, a hydraulically actuated plunger positioned adjacent said turret, said plunger being constructed and arranged in a manner to move through said turret to lift said mold into engagement with said cylinder to cause injection of material from said cylinder into said mold, hydraulic means associated with said cylinder for resisting said plunger to thereby apply clamping pressure to said mold, and means actuated by movement of said cylinder for feeding material thereto in proportion to said movement.

6. A plastic injection machine comprising an injection plunger, an injection cylinder in operative association therewith, a turret constructed and arranged for carrying a plurality of molds into successive alignment with said cylinder, means for causing engagement of said molds with said cylinder whereby material is injected into said molds, means for indexing said turret a portion of a complete revolution, a stationary cam track adjacent said turret having upper and lower cam surfaces which converge and diverge with respect to one another, and means on said molds engaging said cam track surfaces to open and close said molds upon rotation thereof with respect said track.

7. A plastic injection machine comprising an injection plunger, an injection cylinder in operative association therewith, a turret constructed and arranged for carrying a plurality of molds having upper and lower mold members into successive alignment with said cylinder, means for causing engagement of said molds with said cylinder whereby material is injected into said molds, means for indexing said turret a portion of a complete revolution, and a stationary cam track adjacent said turret having a lower surface substantially parallel to said turret and an upper surface which converges and diverges with respect to said lower surface, said upper and lower mold members having means engaging the upper and lower surfaces of said cam track respectively whereby the lower mold member is retained from movement while the upper mold member reciprocates with respect the lower mold member to open and close said mold upon rotation thereof with respect to said cam track.

8. A plastic injection machine comprising an injection plunger, an injection cylinder in operative association therewith, a turret constructed and arranged for carrying a plurality of molds having upper and lower mold members into successive alignment with said cylinder, means for causing engagement of said molds with said cylinder whereby material is injected into said molds, means for indexing said turret a portion of a complete revolution, a stationary cam track adjacent said turret having a lower surface substantially parallel to said turret and an upper surface which converges and diverges with respect to said lower surface, said upper and lower mold members being constructed and arranged to engage said cam track surfaces adjacent thereto to open and close said molds upon indexing of said turret, and means carried by said turret adjacent said molds for guiding the opening and closing movement thereof.

9. A plastic injection machine comprising an injection plunger, an injection cylinder in operative association therewith, a turret constructed and arranged for carrying a plurality of two part molds into successive alignment with said cylinder, a pressure actuated plunger for raising said molds as a unitary structure from said turret into engagement with said cylinder and for moving said cylinder with respect said plunger for injecting material into said molds, and means carried by said turret adjacent said molds for guiding the opening and closing movement thereof.

10. A plastic injection machine comprising a turret constructed and arranged for carrying a plurality of molds, molds disposed upon said turret, a molding station including an injection plunger, an injection cylinder associated therewith, a ram for actuating said mold with respect to said cylinder, a hydraulic motor for actuating said ram, an ejection station including a hydraulic motor and an ejection plunger actuated thereby, means for indexing said turret to successively bring said molds into position in alignment with said injection and said ejection stations, and means for applying fluid pressure in parallel to said injection and ejection motors to thereby inject and eject concomitantly.

11. A plastic injection machine comprising a bed, a fluid motor carried by said bed and having a ram extending therefrom, a vertically positioned strain rod secured to said bed, a turret rotatably carried upon said strain rod, a head reciprocably mounted upon said strain rod above said turret carrying an injection cylinder in alignment with said ram, and a stationary head secured to said strain rod above said reciprocable head carrying a plunger in axial alignment with said cylinder.

12. A plastic injection machine comprising a bed, a fluid motor carried by said bed and having a ram extending therefrom, a vertically positioned strain rod secured to said bed, a turret rotatably carried upon said strain rod, said turret being constructed and arranged to carry a plurality of equidistantly spaced molds, a head reciprocably mounted upon said strain rod above said turret carrying an injection cylinder in alignment with said ram, a stationary head secured to said strain rod above said reciprocable head carrying a plunger in axial alignment with said cylinder, said turret having openings therein through which said ram can engage said mold in alignment therewith for lifting said mold into engagement with said cylinder for advancing said cylinder over said injection plunger whereby material in said cylinder is injected into said mold, a material feeding device carried by said stationary head, and means actuated by each reciprocation of said reciprocable head for feeding material to said cylinder in direct proportion to the stroke of reciprocation thereof.

13. In an injection press the combination of a rotatably mounted turret, a plurality of multiple part molds having an upper and a lower mold part, said molds being equidistantly spaced upon said turret, a station for injecting plastic material into said molds, a station for ejecting work pieces from said molds, means for indexing successive molds into alignment with said injection and ejection stations, and an arcuately shaped cam track means associated with said turret for elevating the upper mold part of successive molds when approaching said ejection station and for lowering the upper mold part of said molds when approaching said injection station.

14. In an injection press the combination of a rotatably mounted turret, a plurality of multiple part molds having an upper and a lower mold part, said molds being equidistantly spaced upon said turret, a station for injecting plastic material into said molds, a station for ejecting work pieces from said molds, means for indexing successive molds into alignment with said injection and ejection stations, an arcuately shaped cam track means associated with said turret having an inclined surface for elevating the upper mold part of successive molds when approaching said ejection station and a declining surface for lowering the upper mold part of said molds when approaching said injection station, said molds having means engaging said cam track surfaces, and cam track means associated with the declining surface of said first mentioned track means engaged by said cam surface engaging means on said molds for insuring closure of the upper mold part upon the lower mold part when advancing toward the injection station.

15. In an injection press the combination of a rotatably mounted turret, a plurality of multiple part molds having an upper and a lower mold part, said molds being equidistantly spaced upon said turret, a station for injecting plastic material into said molds, a station for ejecting work pieces from said molds, means for indexing successive molds into alignment with said injection and ejection stations, an arcuately shaped cam track means associated with said turret having an inclined surface for elevating the upper mold part of successive molds when approaching said ejection station and a declining surface for lowering the upper mold part of said molds when approaching said injection station, said molds having means engaging said cam track surfaces, cam track means associated with the declining surface of said first mentioned track means engaged by said cam surface engaging means on said molds for insuring closure of said upper mold part upon the lower mold part when advancing toward the injection station, and means resiliently positioning said last mentioned cam track means in spaced relation to said first mentioned cam track means.

16. In an injection press the combination of a rotatably mounted turret, a plurality of multiple part molds having an upper and a lower mold part, said molds being equidistantly spaced upon said turret, a station for injecting plastic material into said molds, a station for ejecting work pieces from said molds, means for indexing successive molds into alignment with said injection and ejection stations, an arcuately shaped cam track means associated with said turret having an inclined surface for elevating the upper mold part of successive molds when approaching said ejection station and a declining surface for lowering the upper mold part of said molds when approaching said injection station, said molds having means engaging said cam track surfaces, cam track means associated with the declining surface of said first mentioned track means engaged by said cam surface engaging means on said molds for insuring closure of said upper mold part upon the lower mold part when advancing toward the injection station, means resiliently positioning said last mentioned cam track means in spaced relation to said first mentioned cam track means, and means actuated by said last mentioned cam track means for halting operation of said injection machine.

17. In an injection press the combination of a rotatably mounted turret, a plurality of multiple part molds having an upper and a lower mold part, said molds being equidistantly spaced upon said turret, a station for injecting plastic material into said molds, a station for ejecting work pieces from said molds, means for indexing successive molds into alignment with said injection and ejection stations, an arcuately shaped cam track means associated with said turret having an inclined surface for elevating the upper mold part of successive molds when approaching said ejection station and a declining surface for lowering the upper mold part of said molds when approaching said injection station, said molds having means engaging said cam track surfaces, cam track means associated with the declining surface of said first mentioned track means engaged by said cam surface engaging means on said molds for insuring closure of said upper mold part upon the lower mold part when advancing toward the injection station, means resiliently positioning said last mentioned cam track means in spaced relation to said first mentioned cam track means, means actuated by said last mentioned cam track means for halting operation of said injection machine, said means actuated by said last mentioned cam track means also halting operation of said indexing means.

18. In an injection press the combination of a rotatably mounted turret constructed and arranged for carrying a plurality of equidistantly spaced molds, a station for injecting plastic material into said molds, a station for ejecting work pieces from said molds, means for indexing successive molds into alignment with said injection and ejection stations, means at said ejection station for ejecting work pieces from said molds comprising plunger means actuated by a hydraulic motor, means for locking said turret in an indexed position with the sprue opening of a mold in alignment with said ejection plunger, said ejection plunger being actuated to enter said sprue opening in said mold to eject the work piece therefrom.

19. In an injection press the combination of a rotatably mounted turret constructed and arranged for carrying a plurality of equidistantly spaced molds, a station for injecting plastic material into said molds, a station for ejecting work pieces from said molds, means for indexing successive molds into alignment with said injection and ejection stations, means at said ejection station for ejecting work pieces from said molds comprising plunger means actuated by a hydraulic motor, means for locking said turret in an indexed position with the sprue opening of a mold in alignment with said ejection plunger, said ejection plunger being actuated to enter said sprue opening in said mold to eject the work piece therefrom, and means actuated concomitantly with actuation of said ejection plunger for catching said work piece when ejected from said mold.

20. In an injection press the combination of a rotatably mounted turret constructed and arranged for carrying a plurality of equidistantly spaced molds, a station for injecting plastic material into said molds, a station for ejecting work pieces from said molds, means for indexing successive molds into alignment with said injection and ejection stations, means at said ejection station for ejecting work pieces from said molds comprising plunger means actuated by a hydraulic motor, means for locking said turret in an indexed position with the sprue opening of a mold in alignment with said ejection plunger, said ejection plunger being actuated to enter said sprue opening in said mold to eject the work piece therefrom, means actuated concomitantly with actuation of said ejection plunger for catching said work piece when ejected from said mold, and means actuated by the presence of a work piece in said work piece catching device for indicating the presence or absence of a work piece therein.

21. In an injection press the combination of a rotatably mounted turret constructed and arranged for carrying a plurality of equidistantly spaced molds, a station for injecting plastic material into said molds, a station for ejecting work pieces from said molds, means for indexing successive molds into alignment with said injection and ejection stations, means at said ejection station for ejecting work pieces from said molds comprising plunger means actuated by a hydraulic motor, means for locking said turret in an indexed position with the sprue opening of a mold in alignment with said ejection plunger, said ejection plunger being actuated to enter said sprue opening in said mold to eject the work piece therefrom, means actuated concomitantly with actuation of said ejection plunger for catching said work piece when ejected from said mold, and means actuated by the presence of a work piece in said work piece catching device for indicating the presence or absence of a work piece therein, said last mentioned means halting operation of the press upon absence of a work piece in said work piece catching device.

22. A plastic injection machine comprising a stationary injection plunger, an injection cylinder, a hydraulic motor associated with said cylinder having pressure fluid continuously applied to one side thereof, a double acting hydraulic motor for actuating a ram, said ram being adapted to move molds associated with said injection cylinder for causing injection of material therein, valve means for controlling direction of flow of fluid to said ram rotor, a variable delivery constant pressure pump for supplying fluid to said motors, a check valve in the supply line to said first mentioned motor, a pressure relief valve arranged to by-pass said check valve, and means for shifting said valve means for actuating said ram to advance said mold into engagement with said cylinder and said cylinder over said plunger thereby causing fluid to flow from said first mentioned motor to said second mentioned motor.

23. A plastic injection machine comprising an injection unit having a hydraulic motor for actuating a ram for causing injection of material into a mold, an ejector mechanism having a hydraulic motor for actuating the same, a hydraulic motor for actuating a mechanism disposed adjacent said ejector mechanism for collecting the work piece as ejected from the mold, a variable delivery constant pressure pump for supplying fluid under pressure to said motors, means interconnecting said motors to cause concomitant action thereof, and means in the supply line to said ejector motor for the retarding operation thereof with respect said work piece collecting motor.

24. A plastic injection machine comprising a turret, means for indexing said turret, a plastic injection unit including a ram actuated by a hydraulic motor, means for actuating said indexing mechanism in response to the full retraction position of said ram, means for halting said indexing motion, means for initiating actuation of said ram for an injection cycle, means actuated by the initiation of said injection cycle for controlling the time interval of said cycle, said last mentioned means providing means for reversing actuation of said ram to position said ram in its initial position to re-actuate said indexing means.

25. An injection press comprising an injection plunger, an injection cylinder associated therewith, a turret disposed adjacent said cylinder, a plurality of multiple part molds removably supported on said turret, means for actuating said turret for successively advancing said molds into position adjacent said cylinder, means adjacent said molds for maintaining coaxial alignment of said mold parts when said molds are removed from said turret, and a pressure motor for removing successive molds from said turret into engagement with said cylinder when advanced into alignment therewith.

26. An injection press comprising a stationary injection plunger, an injection cylinder reciprocably associated therewith and having an injection nozzle extending therefrom, a turret disposed adjacent said cylinder, a plurality of multiple part molds removably supported on said turret, means for actuating said turret for successively advancing said molds into coaxial alignment with said injection nozzle, means adjacent said molds for maintaining coaxial alignment of said mold parts when said molds are removed from said turret, and a pressure motor for removing the molds from said turret into engagement with said nozzle to advance said cylinder over said plunger by pressure applied upon said nozzle to cause material in said cylinder to be injected into said molds.

27. An injection press comprising an injection plunger, an injection cylinder associated therewith having an injection nozzle extending therefrom, a turret having a plurality of molds removably carried thereby constructed and arranged to bring successive molds into operative position with respect to said cylinder, and a pressure motor for lifting said molds from said turret into engagement with said nozzle to seal the same upon the mold.

28. An injection press comprising an injection plunger, an injection cylinder associated therewith having an injection nozzle extending therefrom, a turret having a plurality of molds removably carried thereby constructed and arranged to bring successive molds into operative position with respect to said cylinder, and a pressure actuated plunger for lifting said molds from said turret into engagement with said nozzle to seal the same upon the mold and to advance said cylinder upon said injection plunger to apply closing pressure upon said mold and eject material from said cylinder into the mold.

29. An injection press comprising an injection plunger, an injection cylinder associated therewith having an injection nozzle extending therefrom, a turret having a plurality of two part molds removably carried thereby and constructed and arranged to bring successive molds into operative position with respect to said cylinder, and a pressure actuated plunger movable through said turret for lifting said molds from said turret into engagement with said nozzle to seal the same upon said molds and apply closing pressure upon said molds.

30. An injection machine comprising a stationary injection plunger, an injection cylinder reciprocable thereon, a pressure motor for positioning said cylinder in the same determined position upon said plunger after each reciprocation stroke with respect to the same, movable means disposed beneath said cylinder and having a plurality of individual molds removably supported thereon, said means successively advancing said molds into axial alignment with said cylinder, and a single pressure motor for successively removing said molds from said supporting means into engagement with said cylinder and for advancing said cylinder over said plunger through means of said mold, said first mentioned motor resisting said movement whereby clamping pressure is applied to said mold during injection of material thereinto.

31. An injection machine comprising a stationary injection plunger, an injection cylinder reciprocable thereon, a pressure motor for positioning said cylinder in the same determined position upon said plunger after each reciprocation stroke with respect to the same, movable means disposed beneath said cylinder and having a plurality of individual molds removably supported thereon, said means successively advancing said molds into axial alignment with said cylinder, and a single pressure motor for successively removing said molds from said supporting means into engagement with said cylinder and for advancing said cylinder over said plunger through means of said mold, said first mentioned motor resisting said movement whereby clamping pressure is applied to said mold during injection of material thereinto and returning said cylinder to its starting position upon said plunger upon reversing the flow of fluid to the second mentioned motor.

32. An injection press comprising a stationary injection plunger, an injection cylinder reciprocable thereover having an injection nozzle extending therefrom, a hydraulically actuated ram positioned in alignment with said nozzle, a turret table disposed between said ram and said cylinder, a plurality of two part molds removably carried upon said turret table, said molds being constructed and arranged to permit axial movement of the parts relative to each other without complete separation thereof, means for indexing said turret table to successively position said molds into alignment with said cylinder and said ram, and means for actuating said ram to lift the mold in alignment therewith from said turret table into engagement with said nozzle and through means of said mold to move said cylinder with respect to said plunger to thereby eject material from said cylinder into said mold.

33. An injection press comprising a stationary injection plunger, an injection cylinder reciprocable thereover and having an injection nozzle extending therefrom, a hydraulically actuated ram positioned in coaxial alignment with said nozzle, a turret table disposed between said ram and said cylinder, a plurality of two part molds removably carried upon said turret table, said molds being constructed and arranged to permit axial movement of the parts relative to each other without complete separation thereof, means for indexing said turret table to successively position said molds into coaxial alignment with said nozzle and said ram, said turret table having openings therein in alignment with said molds through which said ram can reciprocate, means to actuate said ram to lift the mold in alignment therewith from the turret and into engagement with said nozzle to reciprocate said cylinder with respect to said plunger through means of said nozzle to thereby eject material from said cylinder into said mold, and a pressure actuated motor connected to said cylinder and having fluid pressure continuously applied thereto to resist movement of said ram and apply clamping pressure upon said mold during advancement of said ram through said engaging nozzle.

34. An injection press comprising a stationary injection plunger, an injection cylinder reciprocable thereover and having an injection nozzle extending therefrom, a hydraulically actuated ram positioned in coaxial alignment with said nozzle, a turret table disposed between said ram and said cylinder, a plurality of two part molds removably carried upon said turret table, said molds being constructed and arranged to permit axial movement of the parts relative to each other without complete separation thereof, means for indexing said turret table to successively position said molds into coaxial alignment with said nozzle and said ram, said turret table having openings therein in alignment with said molds through which said ram can reciprocate, means to actuate said ram to lift the mold in alignment therewith from the turret and into engagement with said nozzle to reciprocate said cylinder with respect to said plunger through means of said nozzle to thereby eject material from said cylinder into said mold, and a pressure actuated motor connected to said cylinder for positioning the same upon said plunger and having fluid pressure continuously applied thereto to resist movement of said ram and apply clamping pressure upon said mold during advancement of said ram through said engaging nozzle and returning said cylinder to its starting position upon said plunger when said ram is retracted.

35. A plastic injection machine comprising a bed, a fluid motor carried by said bed and having a ram extending therefrom, a vertically positioned strain rod secured to said bed and having an enlarged portion forming a piston of a fluid motor, a turret rotatably carried upon said strain rod, said turret being constructed and arranged to carry a plurality of molds spaced equidistantly in an annular ring upon said turret, a head slidably mounted upon said strain rod above said turret carrying an injection cylinder in alignment with said ram and having a bore of the same diameter as said piston and cooperating therewith to provide a fluid motor to reciprocate said head on said strain rod, a stationary head secured to said strain rod above said reciprocable head carrying a plunger in axial alignment with said cylinder, said turret having openings therein through which said ram can engage the mold in alignment therewith for lifting said mold into engagement with said cylinder for advancing said cylinder over said injection plunger whereby material in said cylinder is injected into said mold, said second mentioned fluid motor opposing movement of said ram to apply clamping pressure on said mold and retain same in engagement with said cylinder.

WARREN R. TUCKER.